Jan. 20, 1931.   M. J. ULINE   1,789,505
APPARATUS FOR PRODUCING SMALL CUBES OF ICE
Filed June 25, 1928   2 Sheets-Sheet 1
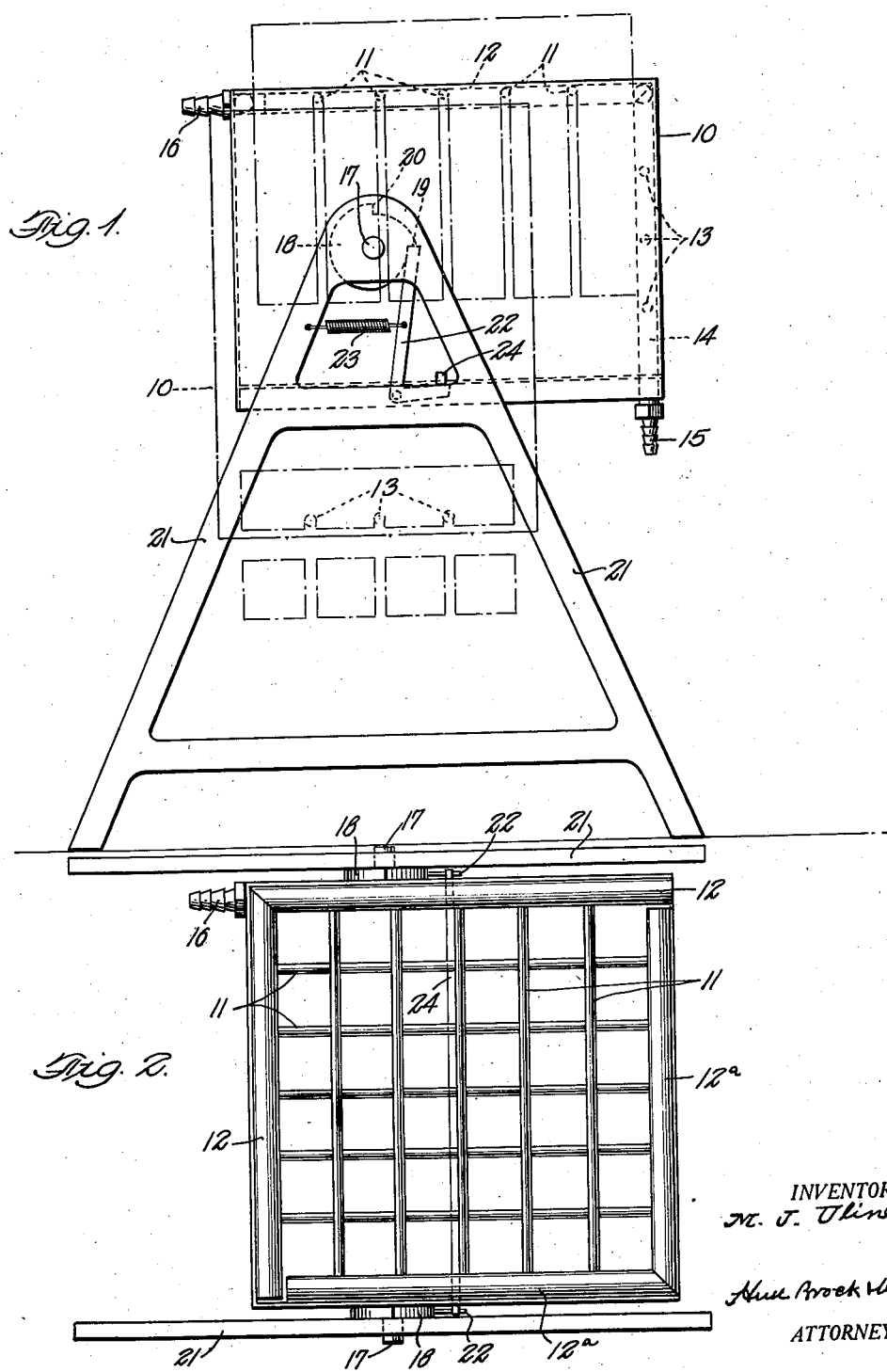
INVENTOR.
M. J. Uline
ATTORNEY.

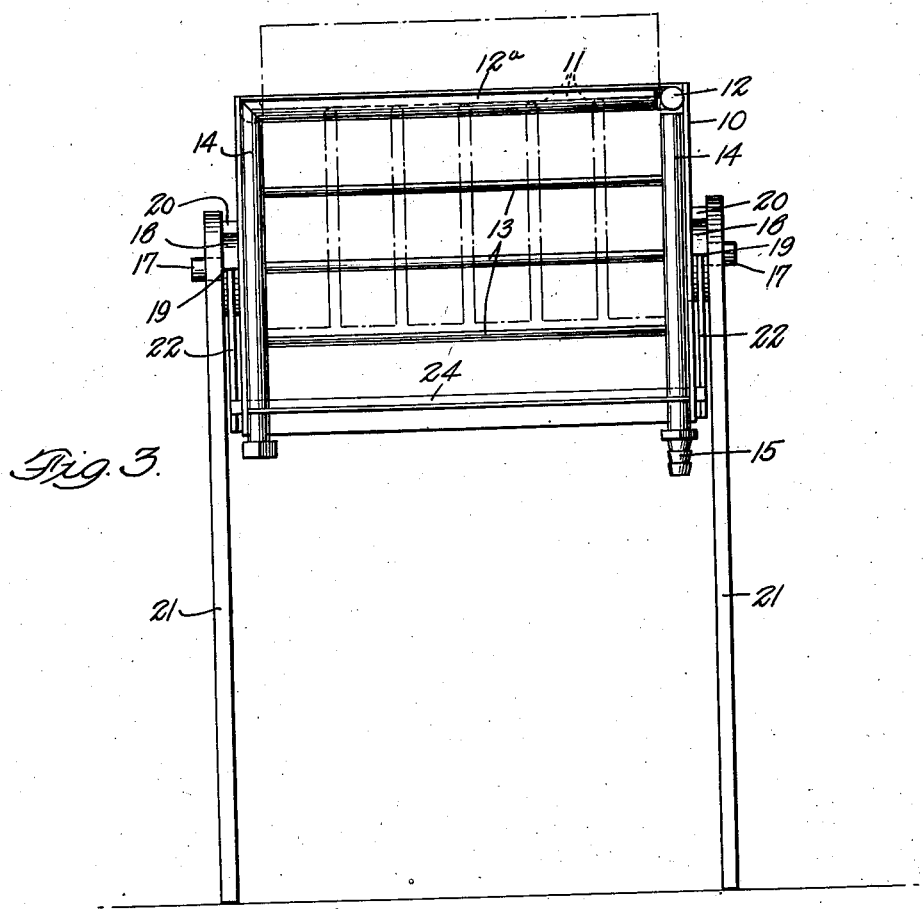
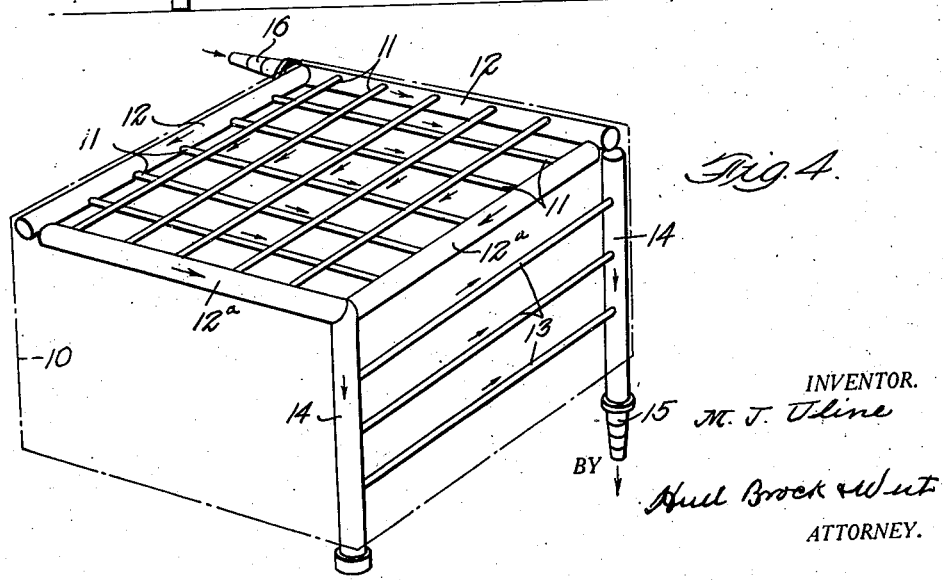

UNITED STATES PATENT OFFICE

MICHIEL J. ULINE, OF TOLEDO, OHIO, ASSIGNOR TO GIFFORD-WOOD COMPANY, OF HUDSON, NEW YORK, A CORPORATION OF NEW YORK

APPARATUS FOR PRODUCING SMALL CUBES OF ICE

Application filed June 25, 1928. Serial No. 287,934.

This invention relates to a simple and efficient apparatus for dividing a cake of ice into a plurality of small cubes suitable for table use. The device is particularly adapted for use in hotels, clubs, lunch rooms and the like where small lumps of ice of uniform size are desired.

An object of the invention therefore is to produce these uniform small size cubes without undue loss of ice and avoiding the use of expensive molding or cutting devices.

Another object of the invention is to provide a device of this kind which will be automatic after placing the cake of ice initially upon or within the dividing mechanism and utilizing the weight of the mass of ice to tilt the device and automatically discharge the small cubical lumps into a suitable receiving receptacle. The device is preferably operated with hot water or steam although electric heating means can be employed if so desired.

In accordance with the invention, I contemplate providing an ice receiving receptacle open at the top, and at one side, arranging a series of heated sub-dividing rods across the top of the receptacle, preferably at right angles to each other, and also a series of heated rods in parallel order across the open side of the receptacle, said receptacle being pivoted eccentrically at its opposite ends and provided with means for normally holding said receptacle in horizontal position, said means being releasable by the weight of the mass of ice for the purpose of automatically tilting the receptacle to discharge the small cubical particles of ice into a suitable receptacle.

In the accompanying drawings forming part of this specification, Fig. 1 is a side elevation of an apparatus constructed in accordance with my invention; Fig. 2 a top plan view of the same; Fig. 3 is a side view and Fig. 4 is a detail perspective view illustrating the heated rods and pipes connected thereto for supplying the heating medium.

In carrying out my invention, I employ a receptacle 10, rectangular in shape, and of any convenient size suitable for receiving an ordinary cake of ice.

This receptacle is open at the top and also at one side thereof and across the top I arrange a series of heated rods 11, preferably at right angles to each other as shown. These rods are tubular for the passage of the heating medium and are united to the pipes or tubes 12 and 12ª which extend around the top edges of the receptacle 10. These pipes 12 and 12ª are somewhat larger in diameter than the tubular rods 11 so that the said tubular rods can be arranged to cross each other and still have their ends connected with the inlet supply pipes 12 and 12ª.

Across the open side of the receptacle there are also arranged heated rods 13 tubular in form and connected to downwardly extending pipes 14, one of which in turn is united to the pipe 12ª. One of these pipes 14 is closed at its lower end while the other one is extended and provided with a hose connection 15 for carrying off water. The inlet pipe 12 is provided with a hose connection 16 to which a hose can be attached and this hose in turn can be connected to the hot water spigot or any suitable hot water or steam supply. If desired, the tubular rods could be provided with an electric heating element properly arranged therein and insulated, but as an inexpensive device, I have found that the tubular rods supplied with either hot water or steam are very efficient for the purposes intended.

The receptacle 10 is provided with trunnions 17 at each end, and in connection with one or both of these trunnions, I employ a plate 18 having shoulders or lugs 19 and 20 produced thereon. The trunnions 17 are journaled in suitable standards 21, and connected to one or both of the standards is an elbow lever 22. The upper end of the lever engages the shoulder or lug 19 of the plate 18 when the receptacle 10 is in a horizontal position, and the lug or shoulder 20 when the receptacle 10 is tilted to 90° for the purpose of discharging the ice cubes therefrom. The upper end of this elbow lever is normally held in engagement with the shouldered plate by means of a coil spring 23 connected to the elbow lever and to the standard. The elbow lever and the plate which it engages form, in effect, a pawl and ratchet catch for the receptacle 10, which is held in the position of Fig. 1 until released.

Contacting with the lower arm of the elbow lever 22 is a pressure bar 24 which extends up into the bottom of the receptacle and when the ice descends between the crossed heated bars 11 and finally reaches the bottom of the receptacle, the weight of this ice upon the pressure bar forces the said bar downwardly, turning the elbow lever upon its pivot and throwing its upper end out of engagement with the lug or shoulder 19. The pivots or trunnions 17 are placed to one side of the vertical center of the receptacle and remote from the open side thereof, so that, the receptacle 10 with the weight of the ice therein, being relieved of support, will tilt so as to bring the open side of the receptacle down to the lowermost position (shown in dotted lines Fig. 1), and the upper end of the elbow lever engaging the stop or lug 20 will support the receptacle in this turned or tilted position.

In operation the cake of ice to be sub-divided is placed upon the crossed heated rods 11, it being understood that the receptacle is at that time in a horizontal position and that the supply pipe 12 is connected with any suitable fluid heating medium which passes through the tubular rods 11 and 13. The cake of ice being placed upon the crossed heated rods will gradually pass downwardly into the receptacle, the heated rods melting the ice by contact therewith and in this manner the entire cake of ice passes down into the receptacle and in so doing is sub-divided into a series of rectangular shaped prisms. When the mass of ice reaches the bottom of the receptacle it presses upon the pressure bar tripping the elbow lever and releasing the support. The receptacle being overbalanced will immediately turn through an angle of 90° bringing the open side lowermost, and inasmuch as this open side has the heated bars extending across in parallel order the rectangular shaped prisms of ice will by their own weight move downwardly and by the melting action of the parallel heated bars be sub-divided in turn into a plurality of cubes, these cubes dropping out at the bottom into a suitable receiving receptacle arranged beneath the ice cake receiving receptacle.

It will thus be seen that I provide an exceedingly simple device, inexpensive in construction and exceedingly easy and convenient in operation as it is only necessary to set the receptacle in horizontal position, turn on the fluid heating medium, and place the cake of ice to be sub-divided upon the crossed heated bars at the top of the receptacle. The bars being heated melt their way through the ice in one direction; and the weight of the ice tipping the receptacle, causes the second series of heated bars to melt their way through the divided portions of the ice in the other direction. In this manner the entire cake of ice is quickly sub-divided into a large number of small cubes suitable for table use. The receptacle can be built in various sizes and the heated bars can be arranged various distances apart in order to cut either large or small cubes as desired. The crossed rods could also be placed at the open side, and the parallel rods at the top if so desired, the final action being exactly the same.

Having thus described my invention, what I claim is:

1. A device for cutting a cake of ice into cubes comprising a receptacle having heated rods arranged at right angles to each other across the top thereof and upon which the ice to be cut rests, and a series of parallel rods arranged across an open side of said receptacle, said receptacle being tiltable through 90° to bring the open side of said receptacle at the bottom whereby the ice, cut into a series of elongated rectangular shaped prisms, will be cut into a plurality of substantially cubical pieces.

2. A device for cutting a cake of ice into cubes comprising a tiltable receptacle having an open side, means for holding said receptacle initially with said opening at the side, said means being releasable to permit the receptacle to tilt and bring the said opening at the bottom, said receptacle having a parallel series of heating rods extending across said opening at the side, there being heating rods arranged at right angles to each other across the top of said receptacle.

3. A device for cutting a cake of ice into cubes comprising a receptacle having pivots at its ends, means for mounting said receptacle in a horizontal position, said receptacle being open at its top and at one side, heated rods arranged at the upper end of said receptacle, heated rods arranged across the open side of said receptacle, said receptacle being so pivoted that when the holding means are released, said receptacle will tilt bringing its open side at the bottom for the purpose specified.

4. A device for cutting a cake of ice into cubes, comprising a receptacle pivoted at its ends, said pivots being arranged at one side of the vertical center of said receptacle, said receptacle being open at the top and also at the side remote from the pivot, heated rods arranged across the top of said receptacle, heated rods arranged across the open side of said receptacle, one set of such rods being arranged at right angles to each other, the other set being parallel, means for holding said receptacle in a horizontal position, said means being releasable by the weight of the ice descending upon the bottom of said receptacle, said receptacle being tiltable upon the release of said holding means to bring the open side upon the bottom for the purpose specified.

5. The combination with a receptacle, pivoted at its ends, said pivots being arranged at one side of the vertical center of said receptacle, of weight released means for holding said receptacle in a horizontal position, the normal upper end of said receptacle being open and having a series of heated rods arranged across said upper end and upon which the cake of ice is placed, said receptacle being also open at the side remote from the pivots, and a series of heated rods arranged across said open side, one of said series of rods being arranged at right angles to each other, the cake of ice descending into the receptacle, tripping the holding means, said receptacle tilting upon the release of said holding means and bringing said open side at the bottom, the cake of ice then emerging from said open side at the bottom in the form of cubes.

6. In a device of the kind described, a receptacle open at the top and at one side, a heated grid arranged across the top and parallel heated bars arranged across the open side, said receptacle being eccentrically pivoted, means for maintaining said receptacle in a horizontal position, said means being releasable by the weight of the ice descending into the receptacle.

7. In a device of the kind described, a receptacle having an open top and open at one side, said receptacle being pivoted eccentrically, means for holding said receptacle in a horizontal position, means for releasing said holding means, a heated grid arranged across one open portion of the receptacle and parallel heated rods arranged across the other open portion of the receptacle.

In testimony whereof, I hereunto affix my signature.

MICHIEL J. ULINE.